United States Patent
Kim (10) Patent No.: US 8,104,689 B2
(45) Date of Patent: Jan. 31, 2012

(54) SMART CARD AND ANTI-SKIMMING SYSTEM INCLUDING THE SAME

(75) Inventor: Yong-Wook Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 477 days.

(21) Appl. No.: 12/333,353

(22) Filed: Dec. 12, 2008

(65) Prior Publication Data

US 2009/0152363 A1  Jun. 18, 2009

(30) Foreign Application Priority Data

Dec. 13, 2007  (KR) .................. 10-2007-0129940

(51) Int. Cl.
*G06K 19/06*  (2006.01)
(52) U.S. Cl. ...................................................... 235/492
(58) Field of Classification Search .................. 235/380, 235/382, 382.5, 492, 493
See application file for complete search history.

(56) References Cited

U.S. PATENT DOCUMENTS

| 6,121,544 | A  | * | 9/2000 | Petsinger ...................... 174/353 |
| 7,083,083 | B2 | * | 8/2006 | Droz .............................. 235/375 |
| 7,243,840 | B2 | * | 7/2007 | Bason et al. ................... 235/380 |
| 2003/0057286 | A1 | * | 3/2003 | Yamagishi et al. ........... 235/492 |
| 2008/0314989 | A1 | * | 12/2008 | Eray .............................. 235/492 |

FOREIGN PATENT DOCUMENTS

| JP | 2005-279975 | 10/2005 |
| KR | 1020070051836 A | 5/2007 |
| KR | 1020070068060 A | 6/2007 |

* cited by examiner

*Primary Examiner* — Seung Lee
(74) *Attorney, Agent, or Firm* — Volentine & Whit, PLLC (57) ABSTRACT

A smart card includes a first integrated circuit (IC) chip and a second IC chip. The first IC chip receives a read signal from an external read device, and is responsive to the read signal to output a data signal to the external read device based on information data stored in a memory. The second IC chip receives the read signal from the external read device, and is responsive to the read signal to output an anti-skimming signal. The anti-skimming signal interferes with the data signal when both the first and second IC chips are in a read zone of the read device.

15 Claims, 9 Drawing Sheets

SMART CARD AND ANTI-SKIMMING SYSTEM INCLUDING THE SAME

PRIORITY CLAIM

A claim of priority under 35 U.S.C. §119 is made to Korean Patent Application No. 10-2007-0129940, filed Dec. 13, 2007, the disclosure of which is incorporated by reference herein.

SUMMARY

Example embodiments of the present invention relates to smart cards, and more particularly, to smart cards adopting anti-skimming circuitry.

Smart cards, which include one or more integrated circuit (IC) chips that store personal identification and other confidential information, are electronic devices which may be utilized to replace conventional personal identification (ID) documents, such a paper passports and ID cards. An electronic passport is an example of a smart card. In this case, a card reader (e.g., located at an airport) is utilized to read personal identification information stored in the electronic passport. The passport may be read by the card reader in a contact or contact-less manner.

Smart cards, such as electronic passports, are vulnerable to data theft in which a card reader device is conspicuously placed in general proximity to an unknowing victim in possession of the smart card. Illegal or unauthorized reading (snooping) of smart card personal information is referred to herein as skimming.

According to an aspect of the present invention, a smart card is provided which includes a first integrated circuit (IC) chip and a second IC chip. The first IC chip receives a read signal from an external read device, and is responsive to the read signal to output a data signal to the external read device based on information data stored in a memory. The second IC chip receives the read signal from the external read device, and is responsive to the read signal to output an anti-skimming signal. The anti-skimming signal interferes with the data signal when both the first and second IC chips are in a read zone of the read device.

BRIEF DESCRIPTION OF THE DRAWINGS

The above and other features and advantages of the present invention will become more apparent from the detail description that follows, with reference to the accompanying drawings, in which.

DETAILED DESCRIPTION OF THE EMBODIMENTS

The accompanying drawings for illustrating preferred but non-limiting embodiments of the present invention are referenced herein in order to assist the reader in obtaining sufficient understanding of the present invention, the merits thereof, and the objectives accomplished by the implementation of the present invention. Hereinafter, the present invention will be described in detail by explaining preferred embodiments of the invention with reference to the accompanying drawings. Like reference numerals in the drawings denote like elements.

Figure 1:
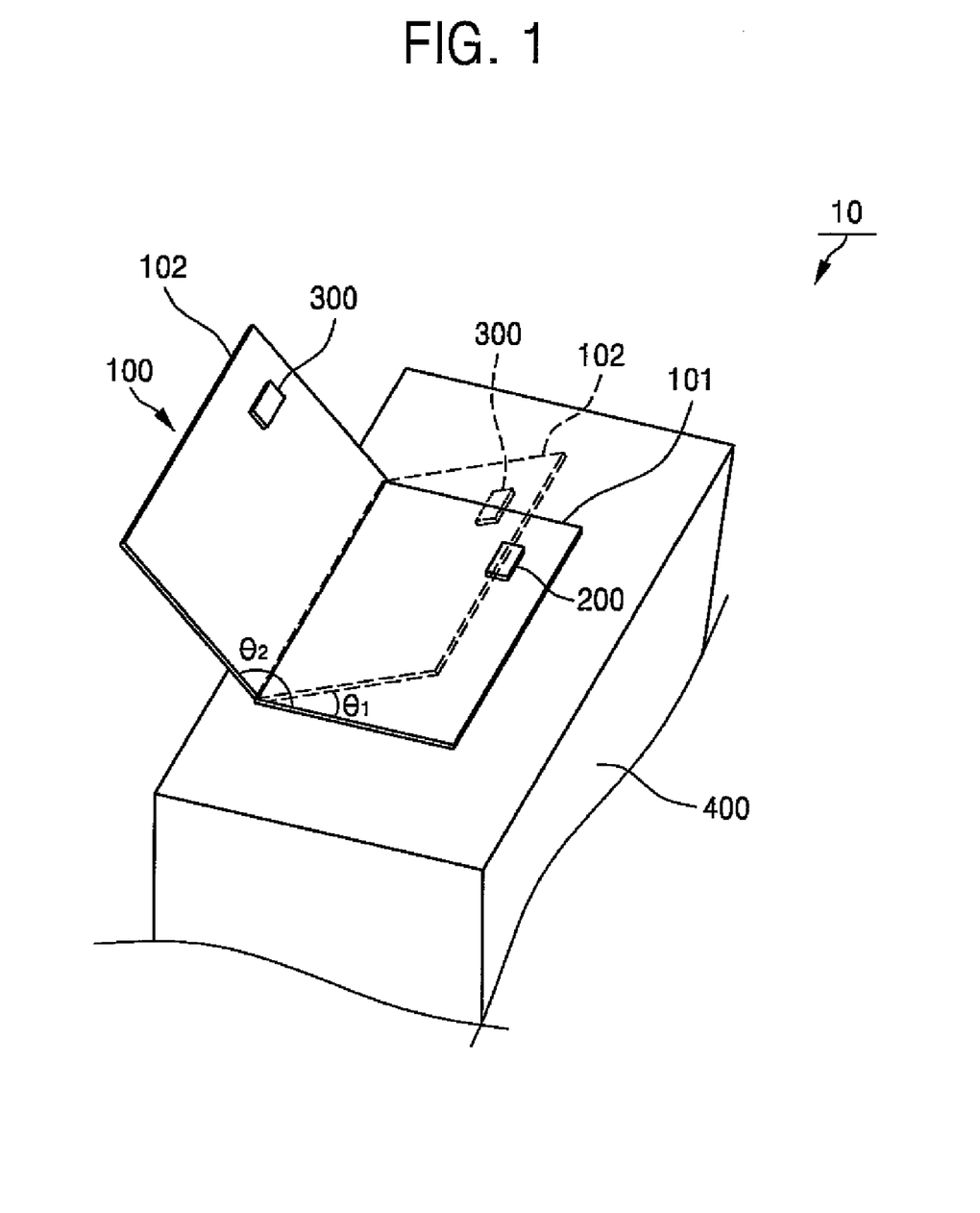
FIG. 1 is a perspective view of an anti-skimming system according to an embodiment of the present invention.

FIG. 1 is a perspective view of an anti-skimming system according to an embodiment of the present invention. Referring to FIG. 1, the anti-skimming system 10 of this example includes a smart card 100 and a read device 400 for reading the smart card 100. In this example, the smart card 100 is an electronic passport.

The electronic passport 100 is foldable into opened and closed positions, and includes a plurality of pages 101 and 102. The pages 101 and 102 may be outer covers of the electronic passport and/or internal pages of the electronic passport 101 and 102. Electronic IC chips 200 and 300 are respectively positioned on or within the pages 101 and 102 so as to be relatively close to another when the passport 100 is folded into a closed position, and so as to be relatively spaced apart from each other when the passport 100 is unfolded into an open position.

The IC chip 200 is a data IC chip which stores personal information data, and the IC chip 300 is an anti-skimming chip which, as explained below, prevents unauthorized skimming of the personal information when the passport 100 is in the folded (closed) position.

Although not shown in the drawings, each of the IC chips 200 and 300 may be electrically connected to an antenna formed along the edge of each page 101 or 102. Also, the antenna may form a closed loop with the data chip 200 and/or the anti-skimming chip 300.

The read device 400 outputs a read signal having a predetermined frequency. The data IC chip 200 of the electronic passport 100 modulates the received read signal based on personal information data stored in the data IC chip 200 to generate a data signal. The generated data signal is output to the read device 400. The read device 400 receives the generated data signal and demodulates the data signal to read the personal information data stored in the data chip 200. The signal transmission/reception between the electronic passport 100 and the read device 400 may be in a contact or contact-less manner.

When the anti-skimming IC chip 300 of the electronic passport 100 is in a read zone of the read device 400, the anti-skimming IC chip 300 also receives the read signal from the read device 400 and generates an anti-skimming signal by modulating the received read signal. The anti-skimming signal has a frequency which is substantially the same as the data signal transmitted by the data IC chip 200, and thus interferes with the data signal transmitted by the data IC chip 200. Accordingly, the read device 400 receives the data signal and the anti-skimming signal which are jammed at the same frequency so that the personal information data may not be reliably read.

According to the present embodiment, the anti-skimming chip 300 of the electronic passport 100 is activated when it is located in the read zone of the read device 400. That is, the read device 400 outputs the read signal to a predetermined read zone. For example, the read zone may be a region directly over a face or end of the read device 400. When the anti-skimming IC chip 300 of the electronic passport 100 is positioned in the read zone of the read device 400, the anti-skimming chip 300 of the electronic passport 100 generates the anti-skimming signal.

Referring to FIG. 1, it is assumed that the read zone is directly above the read device 400 depicted in the drawing, and that the passport 100 is place in this read zone of the read device 400.

When the electronic passport 100 is open at an angle θ1, for example, about 0° to 90°, the data chip 200 and the anti-skimming chip 300 of the electronic passport 100 are both positioned in the read zone of the read device 400. Thus, both the data IC chip 200 and the anti-skimming IC chip 300 are activated to transmit signals of substantially the same frequency. The signals interfere with one another, and cannot be deciphered by the read device 400.

When the electronic passport 100 is open at an angle θ2, for example, about 90° to about 180°, the data chip 200 and the anti-skimming chip 300 are spaced sufficiently apart from each other such that only the data chip 200 is in the read zone of the read device 400. Accordingly, the anti-skimming chip 300 is not simultaneously activated with the data chip 200, and the read device 400 receives the data signal from the data chip 200 and reads the personal information data therefrom.

Typically, a user will carry the electronic passport 100 in a closed (or folded) state, such that the data chip 200 and the anti-skimming chip 300 are closely positioned. In this state, as explained above, electronic skimming is prevented.

Although in the present embodiment the anti-skimming system is used for the electronic passport 100, the present invention is not limited thereto. That is, the anti-skimming system may be used for any smart card application requiring the secure storage of information data. Further, the term "smart card" is broadly defined herein to include any type of portable electronic device which may be subject to unauthorized electronic skimming of stored information.

Figure 2:
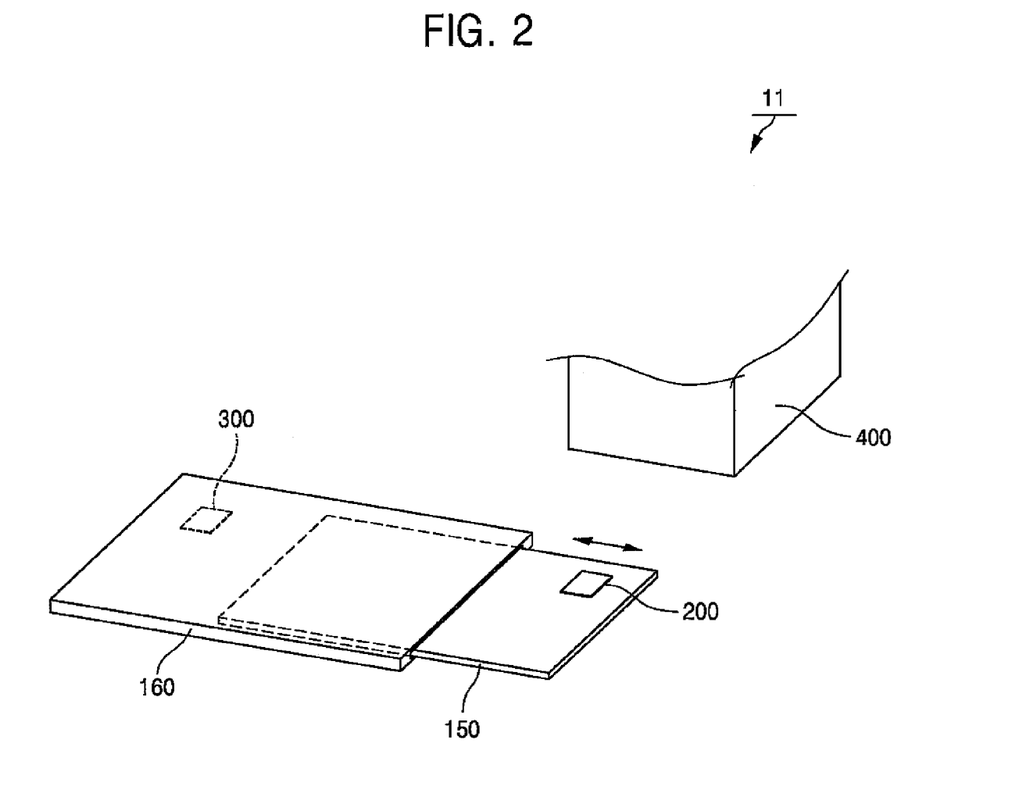
FIG. 2 is a perspective view of an anti-skimming system according to another embodiment of the present invention.

FIG. 2 is a perspective view of an anti-skimming system 11 according to another embodiment of the present invention.

Referring to FIG. 2, the anti-skimming system 11 of this example includes a smart card (150/160) and a read device 400. The smart card includes two structures which are movable relative to one another, namely, a smart card component 150 and a shield case component 160. The smart card component 150 includes the data chip 200 which stores personal information data, and the shield case component includes the anti-skimming chip 300. The shield case component 160 is configured to slidably receive the smart card component 150. The smart card component 150 may or may not be fully detachable from the shield case component 160. Further, the smart card component 150 and the shield case component 160 may further include antennae (not shown) that may be electrically connected to each of the data chip 200 and the anti-skimming chip 300.

The embodiment of FIG. 2 functions similarly to that of the embodiment of FIG. 1. That is, when the smart card component 150 is fully received within the shield case component 160 (i.e., when the smart card is being carried by the user), the data chip 200 and the anti-skimming chip 300 are in close proximity to each other. Thus, if the smart card is place in the read zone of the read device 400, both the data chip 200 and anti-skimming chip 300 are activated. As explained above, this results in signal interference which prevents unauthorized reading of the personal information stored in the data chip 200.

In contrast, when the smart card component 150 is partially or fully removed from the shield case component 160, the data chip 200 and anti-skimming chip 300 are spaced sufficiently far apart that only the data chip 200 may be placed in the read zone of the read device 400. As a result, the anti-skimming chip 300 is not activated, and the personal information stored in the data chip 200 may be read.

The anti-skimming systems 10 and 11 of FIG. 1 will be described in more detail below with reference to FIGS. 3-7.

Figure 3:
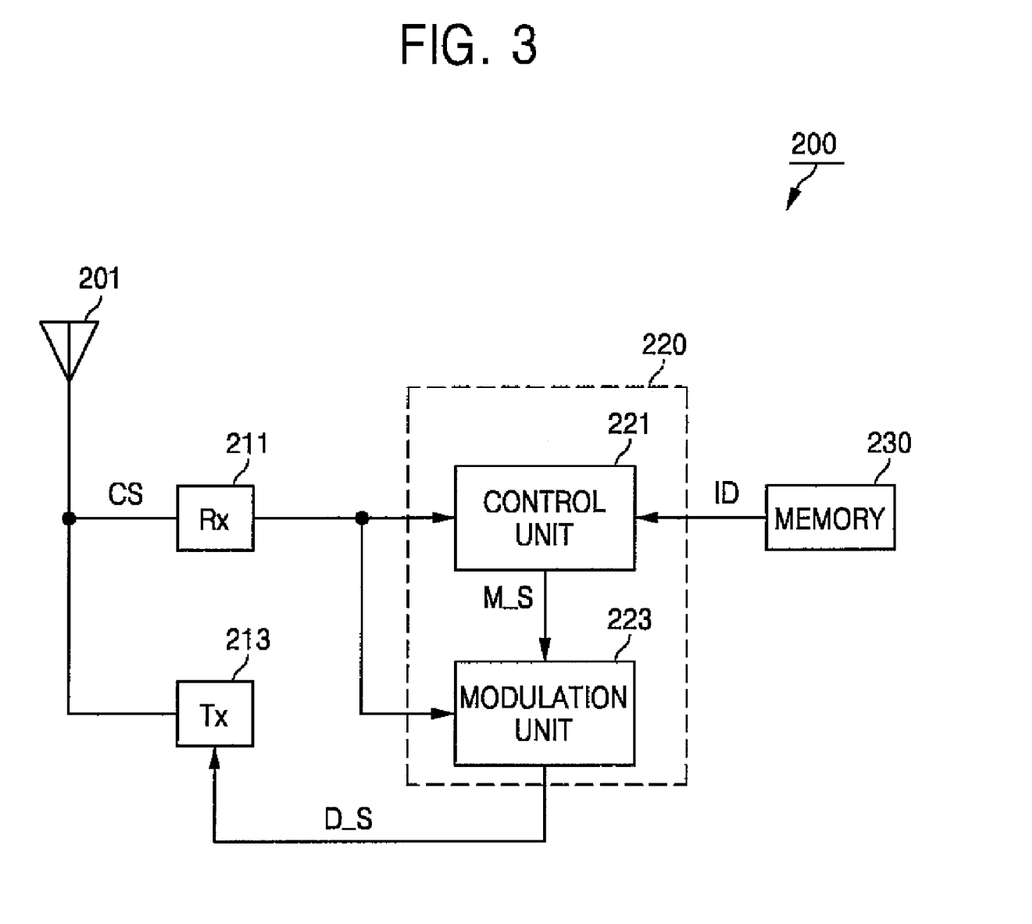
FIG. 3 is a block diagram of a data chip of a smart card according to an embodiment of the present invention.
Figure 4:
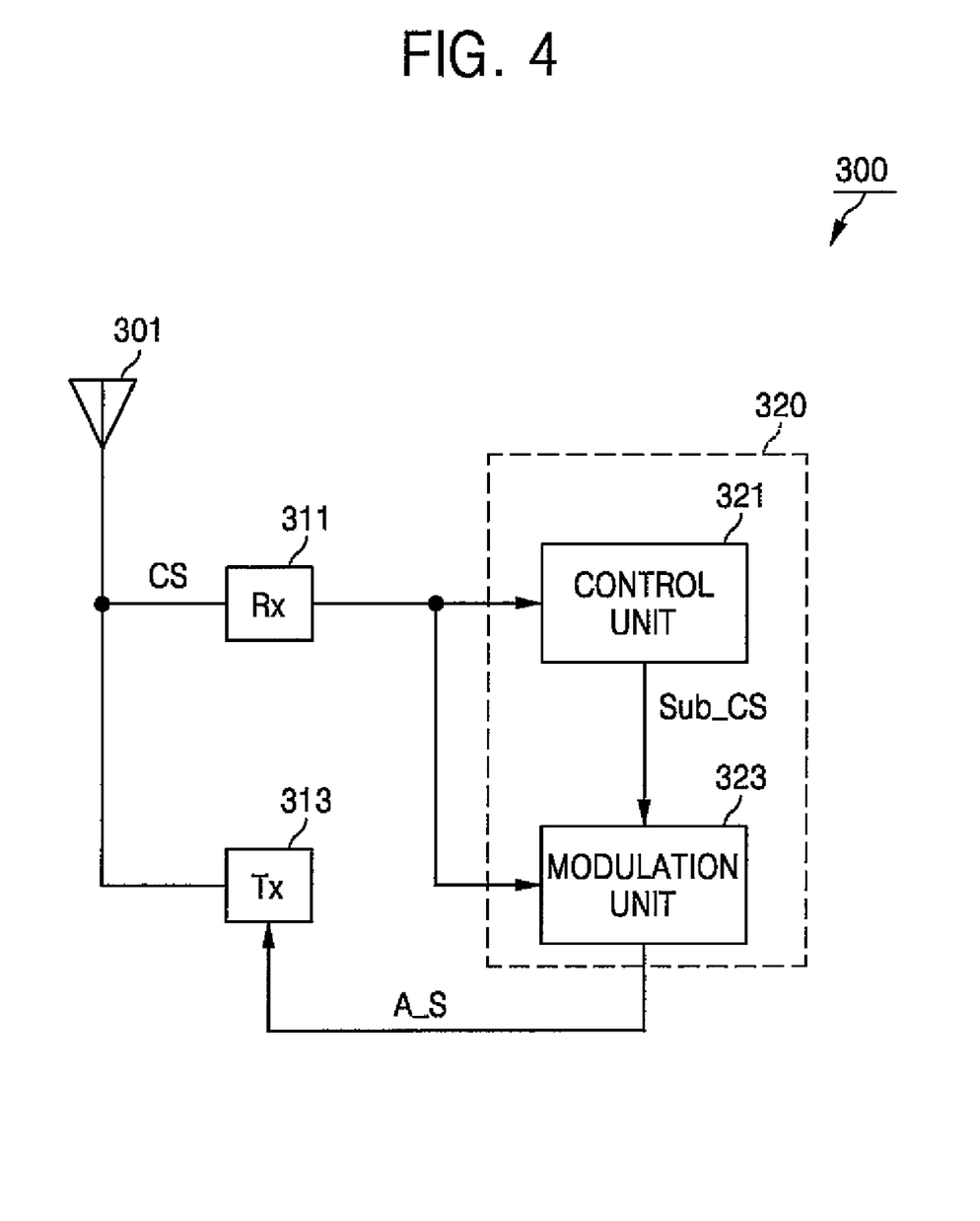
FIG. 4 is a block diagram of an anti-skimming chip of smart card according to an embodiment of the present invention.
Figure 5:
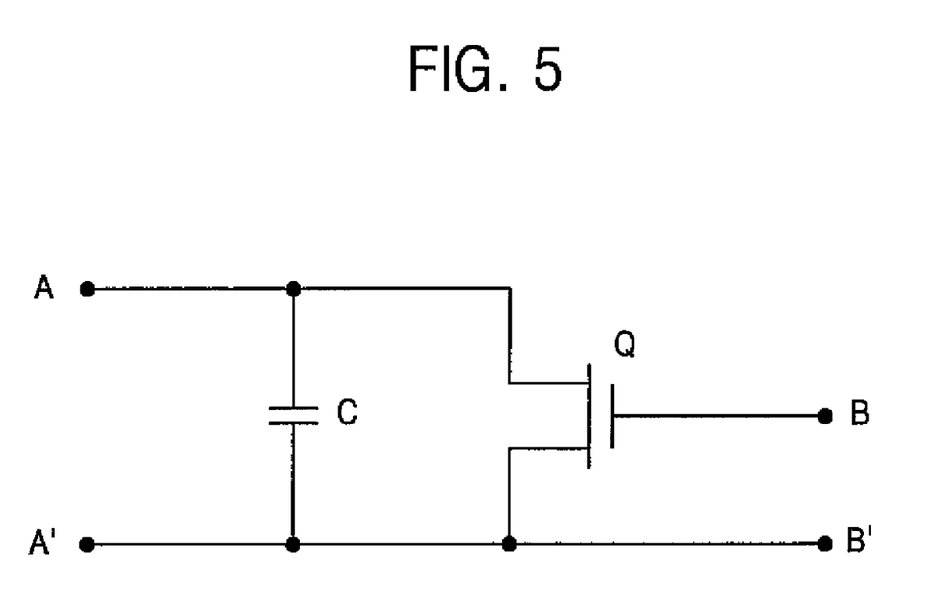
FIG. 5 is a circuit diagram of the modulation unit of FIGS. 3 and 4 according to an embodiment of the present invention.
Figure 6:
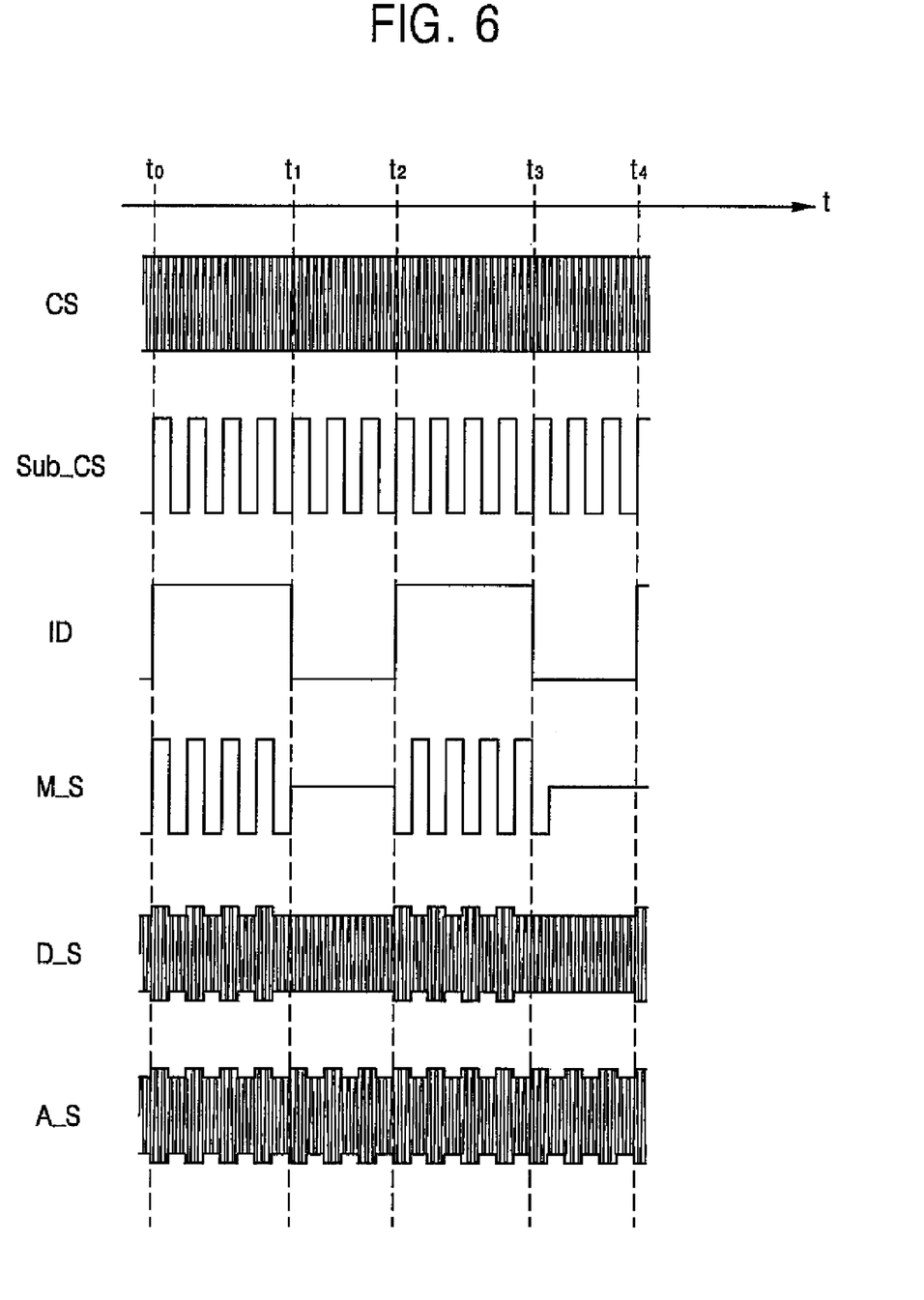
FIG. 6 illustrates signal waveforms for use in describing an operation of an anti-skimming system including the data and anti-skimming chips of FIGS. 3 and 4.
Figure 7:
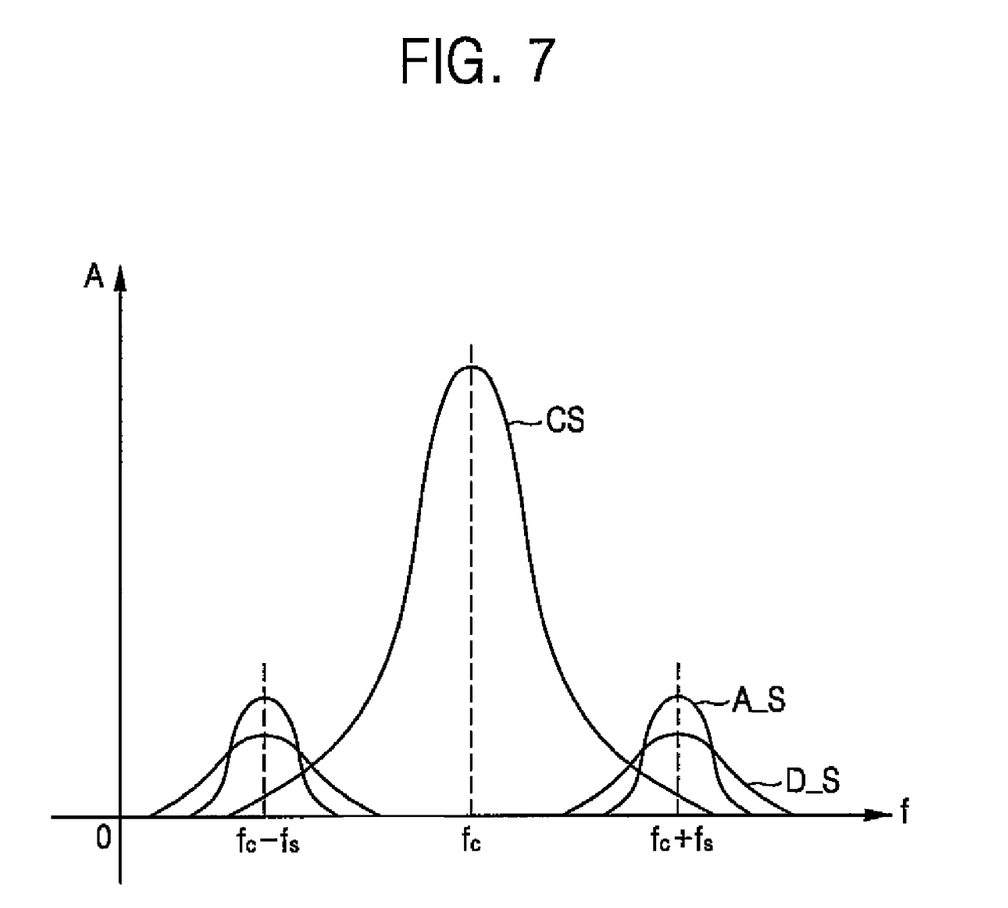
FIG. 7 is a frequency spectrum plot showing frequency characteristics of the signals illustrated in FIG. 6.

FIG. 3 is a block diagram of a data IC chip of a smart card according to an embodiment of the present invention. FIG. 4 is a block diagram of an anti-skimming IC chip of a smart card according to an embodiment of the present invention. FIG. 5 is a circuit diagram of the modulation unit illustrated in each of FIGS. 3 and 4. FIG. 6 illustrates waveform diagrams of operational signals of the IC chips of FIGS. 3 and 4. FIG. 7 is a frequency spectrum plot showing frequency characteristics of signals shown in FIG. 6.

Referring to FIG. 3, the data IC chip 200 includes an antenna 201, a receiving unit 211, a transmission unit 213, a modulator 220, and a memory 230.

The antenna 201 and the receiver (Rx) 211 receive a read signal CS from a external read device, and the antenna 201 and transmitter (Tx) 213 transmit a data signal D_S to the external read device.

The modulator 220 includes a control unit 221 and a modulation unit 223. The control unit 221 divides the read signal CS and modulates the read signal CS based on personal information data ID stored in the memory 230 to generates a modulation signal M_S. The modulation unit 223 modulates the modulation signal M_S provided by the control unit 211 and the read signal CS and generates the data signal D_S. The generated data signal D_S is output to the read device via the transmitter 213 and the antenna 201. The memory 230 stores the personal information data ID and provides the personal information data ID to the control unit 221 of the modulator 220.

Referring to FIGS. 3, 5, and 6, the read signal CS provided by the read device is received by the antenna 201 of the data chip 200. The received read signal CS is provided to the modulator 220 via the receiver 211. The read signal CS may have a predetermined frequency. In the example of the present embodiment, the read signal CS is a signal having a frequency of about 13.56 MHz.

The read signal CS is input to the control unit 221 and/or the modulation unit 223 of the modulator 220. The control unit 221 divides the read signal CS to generate a divided signal Sub_CS. The divided signal Sub_CS may be generated by frequency dividing the read signal CS at a ratio of 1/16. However, the present invention is not limited thereto and, for example, the divided signal Sub_CS may be generated by frequency dividing the read signal CS at a ratio of 1/2n (n is a positive integer).

The control unit 221 generates the modulation signal M_S by modulating the divided signal Sub_CS based on the personal information data ID provided by the memory 230. The modulation signal M_S may have substantially the same frequency as the divided signal Sub_CS.

Referring to FIG. 6, the personal information data ID provided by the memory 230 is a digital signal that is high (H) during a time period t0-t1, low (L) during a time period t1-t2, high (H) during a time period t2-t3, and low (L) during a time period t3-t4. The divided signal Sub_CS is a signal of about 847 KHz generated by frequency dividing the read signal CS at a ratio of 1/16.

The control unit 221 modulates the divided signal Sub_CS according to the personal information data ID to generate the modulation signal M_S. In other words, the control unit 221 modulates the divided signal Sub_CS according to a high or low level of the personal information data ID to generate the modulation signal M_S.

The modulation signal M_S indicates a high level in the time period of t0-t1, a low level in the time period of t1-t2, a high level in the time period of t2-t3, and a low level in the time period of t3-t4, on the time axis t. Although the modulation signal M_S of the present embodiment may be generated in an amplitude shift keying (ASK) method for modulating the amplitude of the divided signal Sub_CS according to the level of the personal information data ID, the present invention is not limited thereto.

Referring to FIGS. 3 and 6, the modulation signal M_S generated by the control unit 221 is provided to the modulation unit 223. The modulation unit 223 modulates the read signal CS according to the modulation signal M_S to generate the data signal D_S. Although the modulation unit 223 load modulates the read signal CS according to the modulation signal M_S to generate the data signal D_S, the present invention is not limited thereto.

Referring to FIG. 5, the modulation unit 223 includes a switching device Q and a capacitor C. The switching device Q of the modulation unit 223 may be formed of, for example, a MOSFET. Referring to FIGS. 5 and 6, the read signal CS and the modulation signal M_S are respectively input to a port A-A' and a port B-B' of the modulation unit 223. The modulation signal M_S may be a signal having a frequency of about 847 KHz that is obtained by modulating the divided signal Sub_CS based on the personal data signal ID.

The switching device Q is switched according to the modulation signal M_S and output the data signal D_S that is load modulated according to the switching operation of the switching device Q. Referring to FIG. 7, the generated data signal D_S may be generated around the frequency fc of the read signal CS. That is, the data signal D_S may appear at the frequencies of fc+fs and fc−fs that are obtained by adding the frequency fs of the modulation signal M_S to the frequency fc of the read signal CS, or subtracting the frequency fs of the modulation signal M_S from the frequency fc of the read signal CS.

Referring back to FIG. 3, the data signal D_S generated by the modulation unit 223 is output to the reader via the transmission unit 213 and the antenna 201. Also, the reader demodulates the received data signal D_S and reads out the personal information data from the demodulated data signal.

The anti-skimming chip of an anti-skimming system according to an embodiment of the present invention is described below with reference to FIGS. 4-7. Referring to FIGS. 4 and 6, an anti-skimming chip 300 according to an embodiment of the present invention includes an antenna 301, a transmission unit 313, a receiving unit 311, and a modulator 320.

The antenna 301, the transmission unit 313, and the receiving unit 311 receive a read signal CS provided by the reader and transmit an anti-skimming signal A_S generated by the anti-skimming chip 300 to the reader. The structures of the antenna 301, the transmission unit 313, and the receiving unit 311 may be substantially the same as those of the antenna 201, the transmission unit 213, and the receiving unit 211 of FIG. 3.

The modulator 320 may include a control unit 321 and a modulation unit 323. The control unit 321 divides the read signal CS to generate a divided signal Sub_CS. The modulation unit 323 modulates the divided signal Sub_CS provided by the control unit 321 and the read signal CS provided by the receiving unit 311 to generate the anti-skimming signal A_S. The generated anti-skimming signal A_S is output to the reader via the transmission unit 313 and the antenna 301.

In the operation of the anti-skimming chip 300, first, the read signal CS provided by the reader is received at the antenna 301 of the anti-skimming chip 300. The received read signal CS is provided to the modulator 320 via the receiving unit 311. The read signal CS may have a frequency of about 13.56 KHz, as described above.

The read signal CS provided by the receiving unit 311 is input to the control unit 321 and the modulation unit 323 of the modulator 320. The control unit 321 divides the read signal CS to generate the divided signal Sub_CS. The divided signal Sub_CS may be generated at substantially the same frequency as the divided signal of the above-described data chip 200. That is, the divided signal Sub_CS of the present embodiment may be generated by frequency dividing the read signal CS at a ratio of 1/16 and may have a frequency of about 847 KHz.

The divided signal Sub_CS is provided to the modulation unit 323. The modulation unit 323 modulates the read signal CS according to the divided signal Sub_CS to generate the anti-skimming signal A_S. In other words, the modulation unit 323 may load modulate the read signal CS according to the divided signal Sub_CS to generate the anti-skimming signal A_S. The modulation unit 323 of the present embodiment is substantially the same as the modulation unit 223 of the data chip 200 of FIG. 5, except for the following items. That is, in the modulation unit 323 of the present embodiment, the divided signal Sub_CS provided by the control unit 321 is input to a port B-B' of the modulation unit 323. The switching device Q is switched according to the divided signal Sub_CS so that the read signal CS may be load modulated.

Also, referring to FIG. 7, the anti-skimming signal A_S may have substantially the same frequency as that of the data signal D_S. This is because, as shown in FIGS. 3, 4, and 6, the divided signal Sub_CS generated by the control unit 321 of the anti-skimming chip 300 has substantially the same frequency as that of the modulation signal M_S and the divided signal Sub_CS generated by the control unit 221 of the data chip 200.

As shown in FIG. 5, the modulation units 223 and 323 of the data chip 200 and the anti-skimming chip 300 may have substantially the same structure. Accordingly, the data signal D_S and the anti-skimming signal A_S respectively generated by the data chip 200 and the anti-skimming chip 300 may have substantially the same frequency.

As shown in FIG. 7, like the data signal D_S, the anti-skimming signal A_S may appear at the frequencies of fc+fs and fc−fs that are obtained by adding the frequency fs of the divided signal Sub_CS, for example, the divided signal Sub_CS having a frequency substantially the same as that of the modulation signal M_S of the data chip 200, to the frequency fc of the read signal CS, or subtracting the frequency fs of the divided signal Sub_CS from the frequency fc of the read signal CS.

Referring to FIGS. 4 and 7, the anti-skimming signal A_S may be output to the reader via the transmission unit 313 and the antenna 301. Next, the reader simultaneously receives the data signal D_S received from the data chip and the anti-skimming signal A_S having a frequency substantially the same as that of the data signal D_S. As the two signals D_S and A_S are jammed at the same frequency, the personal information data may not be read from the data signal D_S.

An anti-skimming system according to another embodiment of the present invention is described below with reference to FIGS. 8 and 9. In the anti-skimming system of the present embodiment, for the convenience of explanation, the data chip 200 of FIG. 3 is used. Accordingly, in the present embodiment, detailed descriptions on the structure and operation of the data chip will be omitted herein. Also, in the present embodiment, FIGS. 3, 5, and 7 are referred to in addition to FIGS. 8 and 9.

Figure 8:
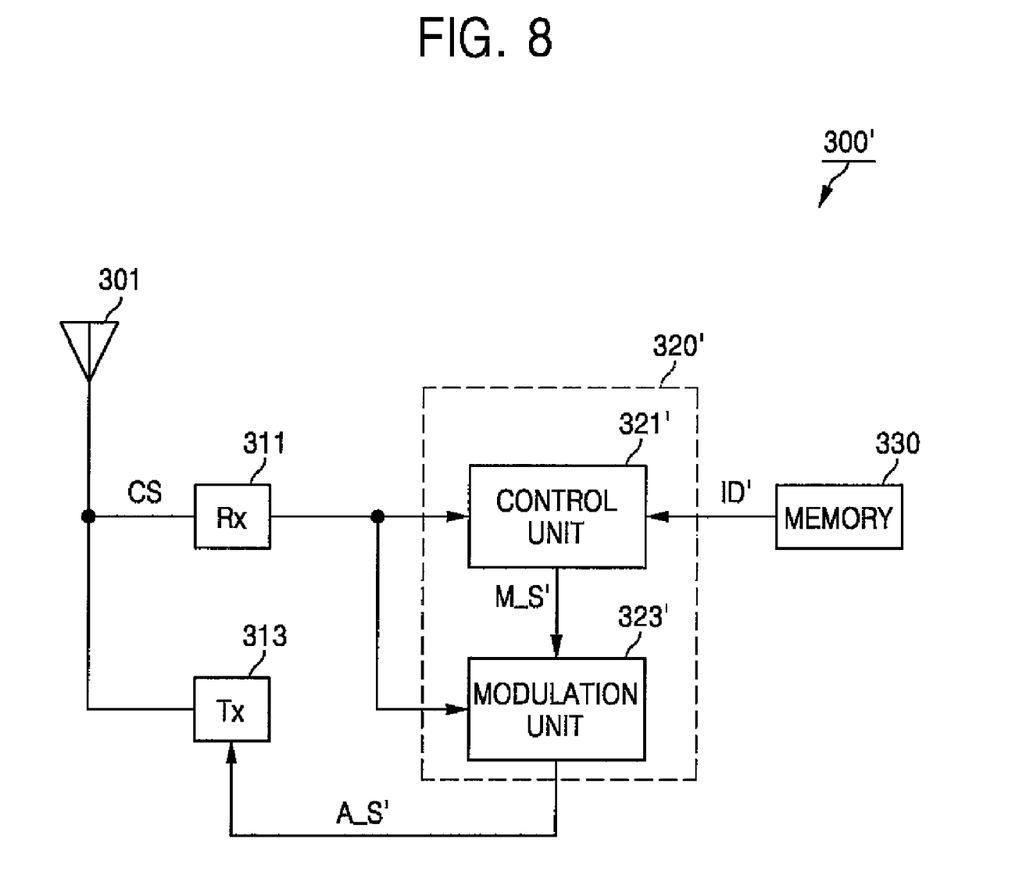
FIG. 8 is a block diagram of an anti-skimming chip of an anti-skimming system according to another embodiment of the present invention.
Figure 9:
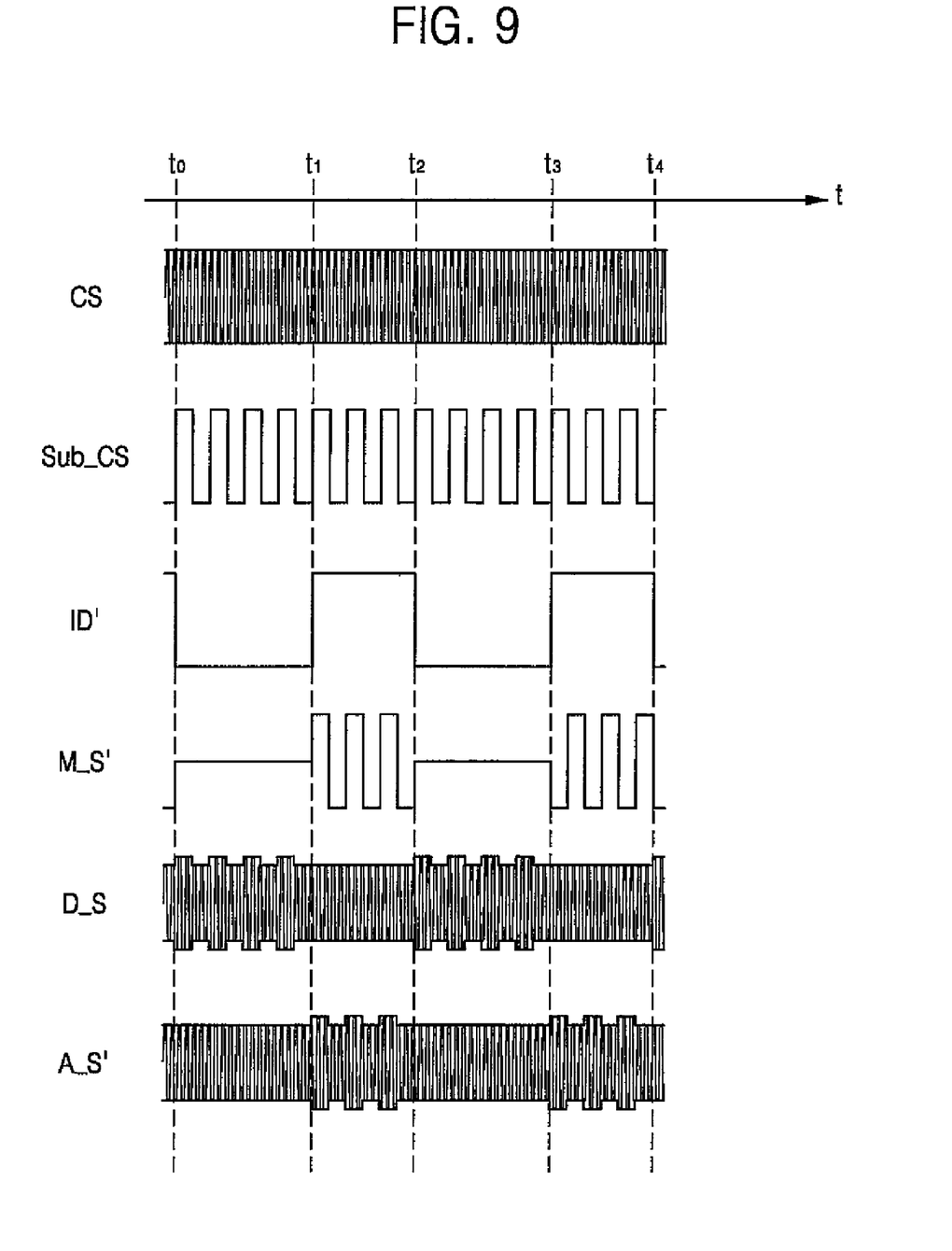
FIG. 9 illustrates signal waveforms for use in describing an operation of an anti-skimming system including the data and anti-skimming chips of FIGS. 3 and 8.

FIG. 8 is a block diagram of an anti-skimming chip of an anti-skimming system according to another embodiment of the present invention. FIG. 9 is a waveform diagram of signals according to the operations of FIGS. 3 and 8. Referring to FIG. 8, an anti-skimming chip 300' of the present embodiment is configured substantially the same as the anti-skimming chip 300 of FIG. 4, except for the following item. That is, the anti-skimming chip 300' of the present embodiment further includes a memory 330 storing random number data.

Since an antenna 301, a transmission unit 313, and a receiving unit 311 are substantially the same as those of FIG. 3, detailed descriptions thereon will be omitted herein. The modulator 320' may include a control unit 321' and a modulation unit 323'. The control unit 321' divides the read signal CS and modulates the read signal CS based on random number data ID' stored in the memory 330 to generate a modulation signal M_S'. The modulation unit 323' modulates the modulation signal M_S' provided by the control unit 321' and the read signal CS provided by the receiving unit 311 to generate an anti-skimming signal A_S'. The generated anti-skimming signal A_S' is output to the reader via the transmission unit 313 and the antenna 301.

The memory 330 stores, for example, reverse information data ID' having a phase substantially the opposite to that of the personal information data ID stored in the memory 230 of the data chip 200 of FIG. 3. The reverse information data ID' is provided to the control unit 321' of the modulator 320'.

The operation of the anti-skimming chip 300' is described in detail below with reference to FIGS. 8 and 9. First, the antenna 301 of the anti-skimming chip 300' receives the read signal CS from the reader. The read signal CS may have a frequency of about 13.56 MHz, as described above.

The control unit 321' frequency divides the received read signal CS at a ratio of 1/16 to generate the divided signal Sub_CS. Also, the control unit 321' modulates the divided signal Sub_CS based on the reverse personal information data ID' provided by the memory 330 to generate the modulation signal M_S'.

In detail, the reverse personal information data ID' provided by the memory 330 is a digital signal that is low in the time period of t0-t1, high in the time period of t1-t2, low in the time period of t2-t3, and high in the time period of t3-t4, on the time axis t. Also, the divided signal Sub_CS is a signal of about 847 KHz that is obtained by frequency dividing the read signal CS at a ratio of 1/16.

The control unit 321' modulates the divided signal Sub_CS according to the reverse personal information data ID' to generate the modulation signal M_S'. The modulation signal M_S' indicates a low level in the time period of t0-t1, a high level in the time period of t1-t2, a low level in the time period of t2-t3, and a high level in the time period of t3-t4, on the time axis t.

The modulation signal M_S' may be generated in the ASK method as described above. Also, the generated modulation signal M_S' may be a reverse signal having a frequency substantially the same as that of the modulation signal M_S of the data chip 200.

The modulation unit 323' receives the modulation signal M_S' from the control unit 321' and modulates the read signal CS based on the received modulation signal M_S'. The modulation unit 323' may modulate the read signal CS in the load modulation method, as described above, and may be configured substantially identical to that of the circuit of FIG. 5.

That is, in the modulation unit 323' of the present embodiment the read signal CS and the modulation signal M_S' are respectively input to a port A-A' and a port B-B'. The switching device Q performs a switching operation according to the modulation signal M_S'. Accordingly, the read signal CS may be load modulated according to the modulation signal M_S'. The modulation signal M_S' input to the port B-B' of the modulation unit 323' may be a reverse signal having a frequency substantially the same as that of the modulation signal M_S of the data chip 200, as described above.

Referring back to FIG. 8, the anti-skimming signal A_S' generated by the load modulation of the read signal CS is output to the reader via the transmission unit 313 and the antenna 301. The anti-skimming signal A_S' may appear at the frequencies of fc+fs and fc−fs that are obtained by adding the frequency fs of the modulation signal M_S to the frequency fc of the read signal CS, or subtracting the frequency fs of the modulation signal M_S from the frequency fc of the read signal CS, like the data signal D_S as shown in FIG. 7. Accordingly, the reader simultaneously receives the data signal D_S received from the data chip 200 and the anti-skimming signal A_S' having a frequency substantially the same as that of the data signal D_S. Thus, since the two signals D_S and A_S' are jammed at the same frequency, the personal information data may not be read from the data signal D_S.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A smart card, comprising:
   a first integrated circuit (IC) chip which receives a read signal from an external read device, and which is responsive to the read signal to output a data signal to the external read device based on information data stored in a memory;
   a second IC chip which receives the read signal from the external read device, and which is responsive to the read signal to output an anti-skimming signal;
   a foldable structure including a plurality of pages, wherein the first and second IC chips are located at different pages of the foldable structure;
   a first structure which includes the first IC chip; and
   a second structure which includes the second IC chip,
   wherein a relative position between the first and second IC chips is variable,
   wherein the first structure is movable relative to the second structure,
   wherein the anti-skimming signal interferes with the data signal when both the first and second IC chips are in a read zone of the read device, and
   wherein the second structure is a casing for receiving the first structure.

2. The smart card of claim 1, wherein a transmission frequency of the data signal is substantially the same as a transmission frequency of the anti-skimming signal.

3. The smart card of claim 1, wherein the data signal is generated by load modulating the read signal according to the information data.

4. The smart card of claim 1, wherein the anti-skimming signal is generated by load modulating the read signal.

5. The smart card of claim 1, wherein the second IC chip comprises a memory storing a random number data, and wherein the second IC chip converts the read signal to the anti-skimming signal based on the random number data stored in the memory.

6. The smart card of claim 5, wherein the random number data is a reverse data of the information data stored in the memory of the first IC chip.

7. The smart card of claim 5, wherein the anti-skimming signal is generated by load modulating the read signal according to the random number data.

8. A smart card, comprising:
a first integrated circuit (IC) chip which receives a read signal from an external read device, and which is responsive to the read signal to output a data signal to the external read device based on information data stored in a memory; and
a second IC chip which receives the read signal from the external read device, and which is responsive to the read signal to output an anti-skimming signal,
wherein the anti-skimming signal interferes with the data signal when both the first and second IC chips are in a read zone of the read device,
wherein the second IC chip comprises a memory storing a random number data, and wherein the second IC chip converts the read signal to the anti-skimming signal based on the random number data stored in the memory.

9. The smart card of claim 8, wherein a relative position between the first and second IC chips is variable.

10. The smart card of claim 9, further comprising a foldable structure including a plurality of pages, wherein the first and second IC chips are located at different pages of the foldable structure.

11. The smart card of claim 10, wherein the foldable structure is a passport.

12. The smart card of claim 9, further comprising a first structure which includes the first IC chip and a second structure which includes the second IC chip, wherein the first structure is movable relative to the second structure.

13. The smart card of claim 8, wherein the random number data is a reverse data of the information data stored in the memory of the first IC chip.

14. The smart card of claim 8, wherein the anti-skimming signal is generated by load modulating the read signal according to the random number data.

15. The smart card of claim 8, further comprising:
a first structure which includes the first IC chip; and
a second structure which includes the second IC chip,
wherein the second structure is a casing configured to receive and enclose the first structure such that the first structure is slidably removable from the second structure.

* * * * *